(12) United States Patent
Benayoun et al.

(10) Patent No.: US 7,453,806 B2
(45) Date of Patent: Nov. 18, 2008

(54) DYNAMIC DATA PACKET FLOW CONTROL FOR PACKET SWITCHING NODE

(75) Inventors: Alain Benayoun, Cagnes sur Mer (FR); Patrick Michel, La Gaude (FR); Gilles Toubol, Villeneuve Loubet (FR)

(73) Assignee: International Business Machines Corporation, Armonk, NY (US)

( * ) Notice: Subject to any disclaimer, the term of this patent is extended or adjusted under 35 U.S.C. 154(b) by 733 days.

(21) Appl. No.: 10/868,629

(22) Filed: Jun. 15, 2004

(65) Prior Publication Data

US 2004/0264487 A1 Dec. 30, 2004

(30) Foreign Application Priority Data

Jun. 26, 2003 (EP) .................................. 03368058

(51) Int. Cl.
*G01R 31/08* (2006.01)
*G06F 11/00* (2006.01)
*G08C 15/00* (2006.01)
*H04J 1/16* (2006.01)
*H04J 3/14* (2006.01)
*H04L 1/00* (2006.01)
*H04L 12/26* (2006.01)

(52) U.S. Cl. ........................ 370/231; 370/395.1; 710/52

(58) Field of Classification Search ................ 370/229, 370/230, 231, 234, 235, 236, 244, 245, 253, 370/374, 389, 395.3, 395.53, 395.7, 395.71, 370/400, 412, 429; 710/52
See application file for complete search history.

(56) References Cited

U.S. PATENT DOCUMENTS

| | | | | |
|---|---|---|---|---|
| 5,898,671 A * | 4/1999 | Hunt et al. | ................... | 370/235 |
| 5,910,955 A * | 6/1999 | Nishimura et al. | ........... | 370/401 |
| 6,463,485 B1 * | 10/2002 | Chui et al. | ..................... | 710/52 |
| 2004/0218531 A1 * | 11/2004 | Cherian et al. | ............... | 370/235 |

* cited by examiner

*Primary Examiner*—Seema S. Rao
*Assistant Examiner*—Leon Andrews
(74) *Attorney, Agent, or Firm*—Joscelyn G. Cockburn; Schubert Osterrieder & Nickelson PLLC

(57) ABSTRACT

A data packet switching node that temporarily stores data packets received from at least one source network adapter and transmits them to at least one destination network adapter comprises a data packet flow control system to control the data packet flow. The data packet flow control system comprises identifier to determine the at least one destination adapter of each received data packet. Then, flow control logic coupled to the storage allow computing a data packet flow value representing the traffic for the at least one destination adapter. The data packet flow value is transmitted simultaneously to the at least one source network adapter and to the at least one destination network adapter each time a data packet for the at least one destination network adapter is stored into the storage.

17 Claims, 5 Drawing Sheets

DYNAMIC DATA PACKET FLOW CONTROL FOR PACKET SWITCHING NODE

TECHNICAL FIELD

The present invention relates to the flow control of data packets transmitted between Local Area Networks (LAN) interconnected by a switch engine.

BACKGROUND ART

Local Area Networks (LAN) such as Ethernet or token-ring networks, are generally interconnected through hubs. The hub is a system made of LAN adapters that communicate together through a switch card. The switch card is mainly composed of input ports, output ports and a shared memory switch engine.

The data packets received by the input ports are stored into the shared memory at address locations determined by queues containing the packet destination addresses. The packets are de-queued to be transmitted to the destination output ports.

The shared memory having a limited size, a flow control mechanism is generally implemented to control the data packet transfer between each adapter card and the switch engine. Flow control mechanisms are often based on thresholds. The shared memory has a maximum threshold and a minimum threshold. When the number of data packets stored into the shared memory reaches the max. threshold, the switch engine asks the adapter card to stop sending data packets. When the number of data packets stored into the shared memory reaches the min threshold, the switch engine asks the adapter card to resume the transmission of data packets. Drawback of such mechanism is that it is a binary control which operates as 'do transmit' or 'do not transmit', thereby leading to interrupt and resume the data flow.

Therefore, there is a need to have a flow control system wherein the transmission from the adapter cards is never stopped. The present invention offers such solution.

SUMMARY OF THE INVENTION

Accordingly, it is an object of the invention to provide a smooth flow control mechanism between adapter cards and a switch engine.

It is another object to provide a flow control system having less latency between the adapter cards and the switch engine.

It is yet another object of the invention to offer an optimal use of the shared memory of the switch engine.

In a preferred embodiment, the invention relates to a data transmission system comprising a plurality of Local Area Networks (LANs) interconnected by several hubs. Each hub contains a Control Point card, a plurality of adapter cards connected to the Local Area Networks and a switching system made of two switch cards, one being active and the other being backup.

Each data packet transmitted by any adapter card to the switch engine includes a header containing at least the address of the adapter card to which the data packet is forwarded.

The system of the invention operates both in the switch engine and the adapter cards. It comprises a flow control circuitry associated to the shared memory where the data packets are stored. The flow control circuitry operates between each adapter card and the active switch card.

In a preferred embodiment, a data packet switching node that temporarily stores data packets received from at least one source network adapter and transmits them to at least one destination network adapter comprises a data packet flow control system to control the data packet flow. The data packet flow control system is characterized in that it comprises:

identifier means to determine the at least one destination adapter of each received data packet;

means coupled to the storing means for computing a data packet flow value representing the traffic for the at least one destination adapter; and means coupled to the identifier means and to the computing means for transmitting the computed data packet flow value simultaneously to the at least one source network adapter and to the at least one destination network adapter each time a data packet for the at least one destination network adapter is stored into the storing means.

BRIEF DESCRIPTION OF THE DRAWINGS

The above and other objects, features and advantages of the invention will be better understood by reading the following more particular description of the invention in conjunction with the accompanying drawings wherein.

DETAILED DESCRIPTION OF THE INVENTION

Figure 1:
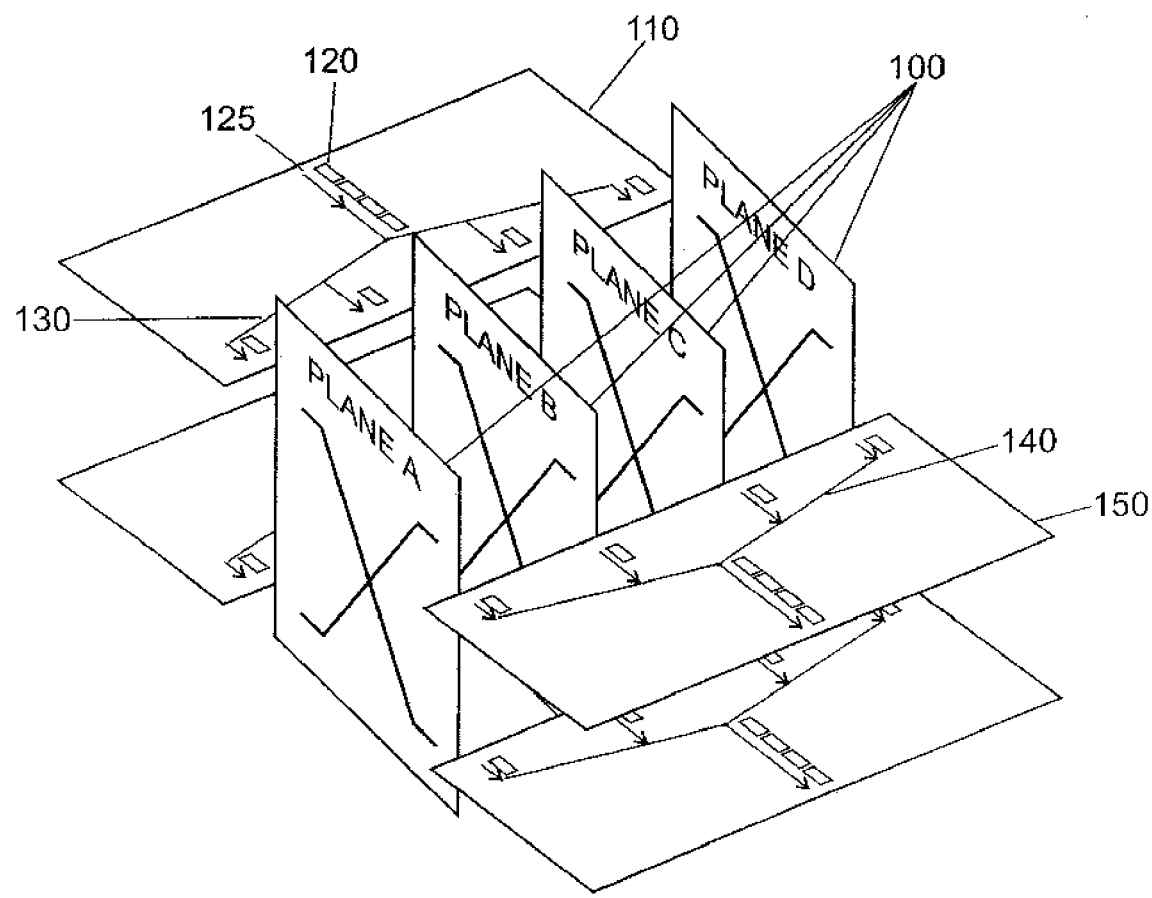
FIG. 1 is a schematic diagram of a data transmission system including four LANs interconnected by a hub according to the principles of the invention.

The invention is preferably implemented in a data transmission environment as illustrated on FIG. 1. For sake of simplicity, the environment is made of four Local Area Networks (LAN) 10_1, 10_2, 10_3, and 10_4 but it could be extended to a plurality of LANs and as such a LAN is also denoted 10_i in the description. LANs 10-i are interconnected together by a hub 12, and may be of the type ATM, Ethernet, or token-ring. Each LAN is connected to a switching system 14 within the hub 12 by means of a respective adapter card 16_1 for LAN 10_1, adapter card 16_2 for LAN 10_2, adapter card 16_3 for LAN 10_3 and adapter card 16_4 for LAN 10_4. Each adapter card (also denoted 16_i) sends data packets by means of a data bus-in (bus-in 13_1 to bus-in 13_4) connected to input ports of the switching system 14. Each adapter card receives data packets by means of a data bus-out (bus-out 15_1 to bus-out 15_4) connected to output ports of the switching system 14. Then, a data bus-in 13_i carries data packets from the respective adapter card 16_i to switching system 14 and data bus-out (15_i) carries data packets from switching system 14 to the adapter card 16_i. Each adapter card also receives flow control information from the switching system 14 by means of a serial interface 17. Then, a serial signal 17 carries flow control information from the switching system 14 to the respective adapter card 16_i. The switching system 14 is made of two distinct switch cards, an active switch card 14_1 and a backup switch card 14_2. The invention is located within each switch card but for the ease of description, let's only describe the active switch card 14_1.

Figure 2:
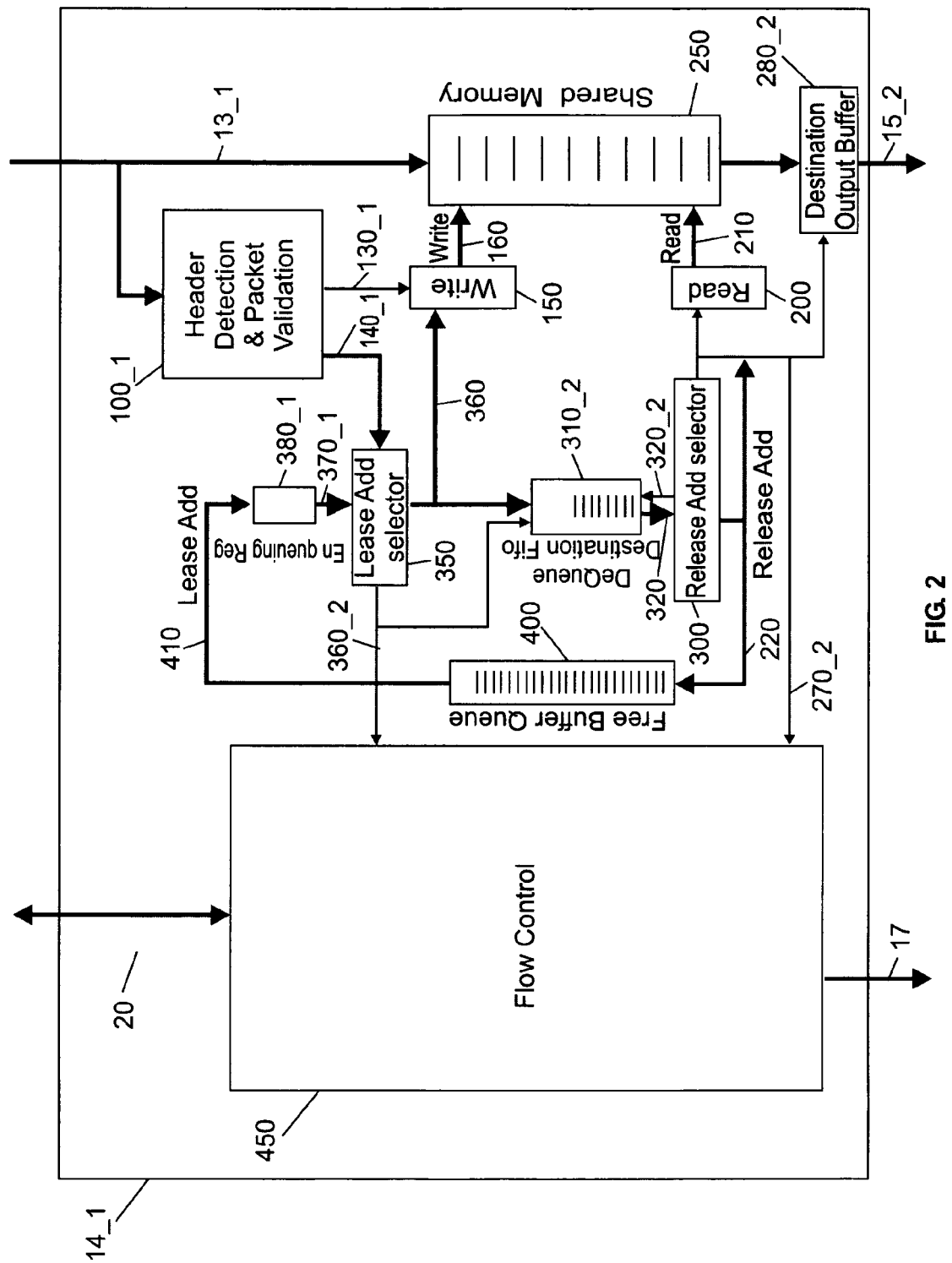
FIG. 2 is a schematic diagram of the switch card of FIG. 1.

Referring now to FIG. 2, the invention is described as part of the switch card 14_1. For the ease of comprehension, let's describe the transmission of a data packet from adapter card 16_1 on data bus-in 13_1 to adapter card 16_2 on data bus-out 15_2. It is to be easily understood that adapter cards 16_1 and 16_2 are only taken as example. In the preferred embodiment, the switch card is mainly composed of:
- a Shared Memory 250;
- a Header Detection and Packet Validation block 100_1;
- a Memory Write entity made of:
  - an En-queue Register block 380_1,
  - a Lease Address Selector block 350,
  - a Memory Write Controller block 150;
- a Memory Read entity made of:
  - a De-queue Destination FIFO block 310_2,
  - a Release Address Selector block 300,
  - a Memory Read Controller block 200,
  - a Destination Output Buffer block 280_2;
- a Free Buffer Queue block 400;
- a Flow Control block 450.

The structure and operation of the different blocks are now described.

Shared Memory (250):

The Shared Memory receives data packets from adapter card 16_1 on data bus-in 13_1 and transmits them to adapter card 16_2 on data bus-out 15_2 through the Destination Output Buffer block 280_2. The write operation is controlled by bus 160 and the read operation by bus 210.

Header Detection and Packet Validation (100_1):

Generally, a data packet is made of a header and a payload. The header contains information such as a destination address, a priority level, and the payload contains the data.

The Header Detection and Packet Validation block 100_1 receives data packets from adapter card 16_1 through data bus-in 13_1. When a valid data packet is detected the destination address is extracted and generated on bus 140_1. In addition, a write enable signal 130_1 is activated.

Memory Write Entity:

The Memory Write Entity is made of an En-queue Register block 380_1, a Lease Address Selector block 350 and a Memory Write Controller block 150.

To detail more each task:

The En-queue Priority Register block 380_1 contains the address where to store an incoming data packet. The address comes from the Free Buffer Queue block 400 through bus 410. The output bus 370_1 is connected to the Lease Address Selector block 350.

Figure 3:
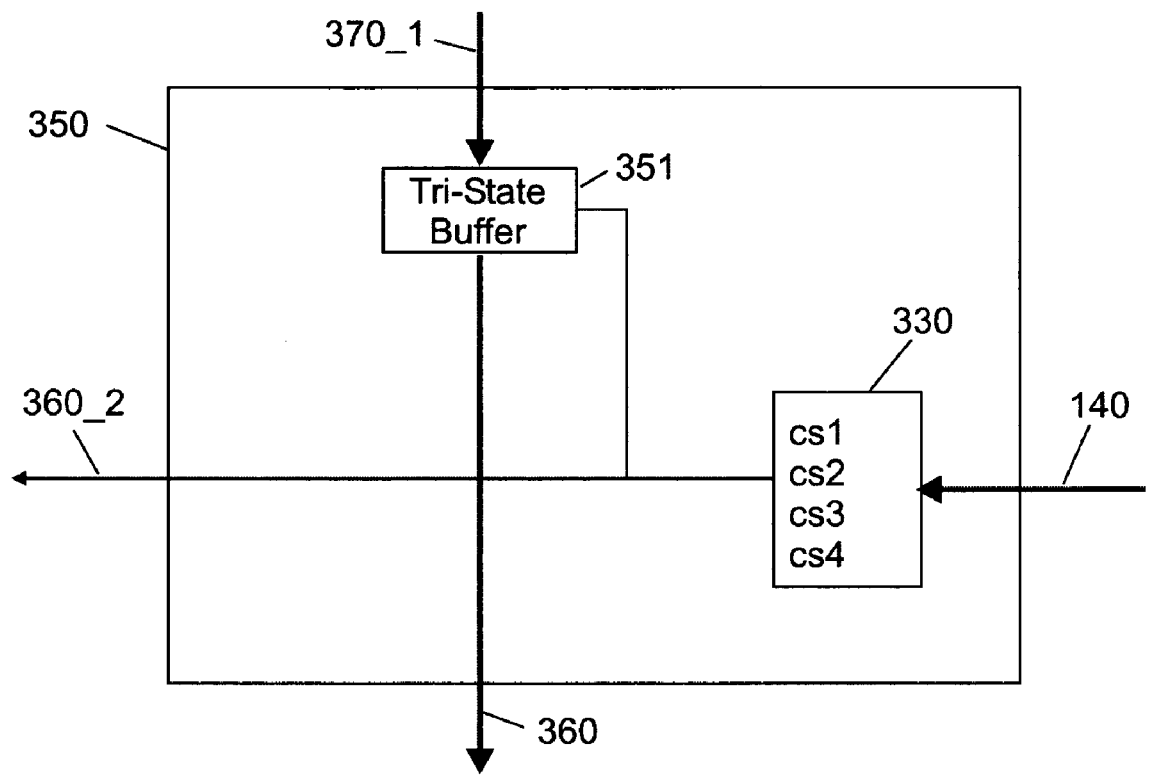
FIG. 3 details the Lease Address Selector block of FIG. 2.

The Lease Address Selector block 350 for destination adapter 16_2 is illustrated in FIG. 3. Its function is to transfer the address stored into En-queue Register block 380_1 onto bus 360 through the buffer block 351. The destination address of the incoming data packet is received on bus 140 by the Destination Decoder block 330 which decodes and activates the corresponding destination chip select signal 360_2. This chip select signal is carried out to Flow Control block 450 and to the De-queue Destination write FIFO input.

The Memory Write Controller block 150 controls the Shared Memory block 250 through bus 160. The write address comes from bus 360 and the write command comes from signal 130_1.

Memory Read Entity:

The Memory Read Entity is made of a De-queue FIFO block 310_2, a Release Address Selector block 300 and a Memory Read Controller block 200.

To detail more each task:

The De-queue Destination FIFO block 310_2 contains the addresses of incoming data packets that have been stored for a transmission to adapter 16_2. The input interface is made of an input FIFO data bus connected to the address bus 360 and an input FIFO write signal connected to the destination chip select signal 360_2. The output interface is made of an output FIFO data bus 320 and an input FIFO read signal 320_2, both being connected to the Release Address Selector block 300.

Figure 4:
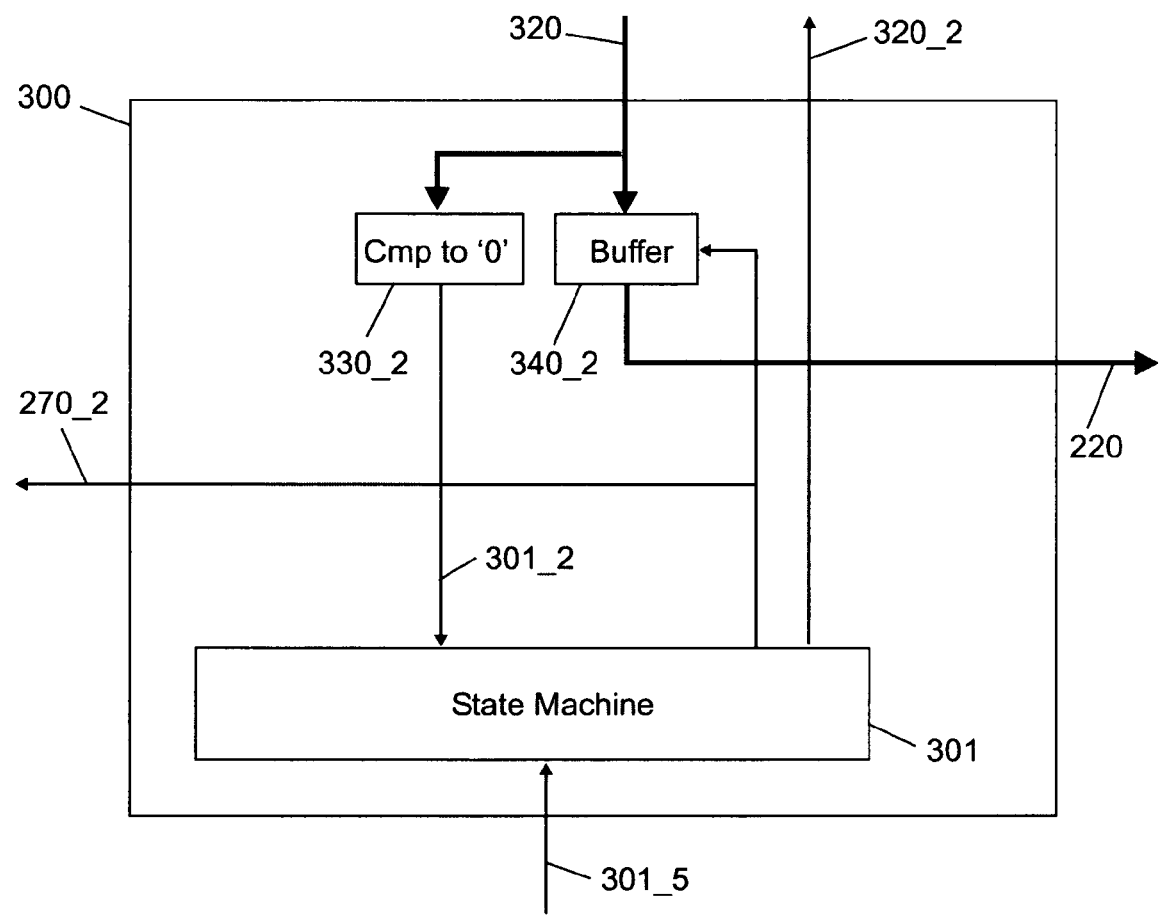
FIG. 4 details the Release Address Selector block of FIG. 2.

The Release Address Selector block 300 for destination adapter 16_2 is illustrated in FIG. 4. Its function is to de-queue and release memory read addresses. A State Machine 301 controls the address de-queue in a round-robin fashion from adapter 16_1 to adapter 16_4. For sake of simplicity, only destination adapter 16_2 is described. A Comparator block 330_2 and a Buffer block 340_2 are connected to the output FIFO data bus 320. The output bus of the buffer is connected to the Memory Read Controller block 200 through bus 220. The State Machine 301 receives the output control signal of Comparator block 330_2 on signal 301_2 and generates a De-queue Destination read FIFO signal 320_2 and a memory read signal 270_2. The read signal is connected to the Memory Read Controller block 200, the Destination Output Buffer block 280_2 and the Flow Control block 450. The State Machine 301 is clocked by the outgoing data packet clock received on signal 301_5. The Release Address Selector block 300 performs the following tasks:
- reads the De-queue Destination FIFO of adapter 16_2 by activating signal 320_2,
- compares its content to zero which is the default value when the FIFO is empty,
- if the control signal 301_2 is activated, performs a memory read operation and release the address into the Free Buffer Queue block 400; if the control signal 301_2 is not activated reads the De-queue Destination FIFO of next adapter.

The Memory Read Controller block 200 controls the Shared Memory block 250 through bus 210. The read address comes from bus 220 and the read command comes from signal 270_2. The data packet is transmitted from the memory to adapter 16_2 through the Destination Output Buffer block 280_2 on bus 15_2.

Free Buffer Queue block (400):

The Free Buffer Queue block 400 contains memory addresses ready to be used. Its output bus 410 provides addresses to the En-queue Register for memory write operations. Its input bus 220 receives addresses from the Release Address Selector block 300 when a memory read operation has been completed.

Figure 5:
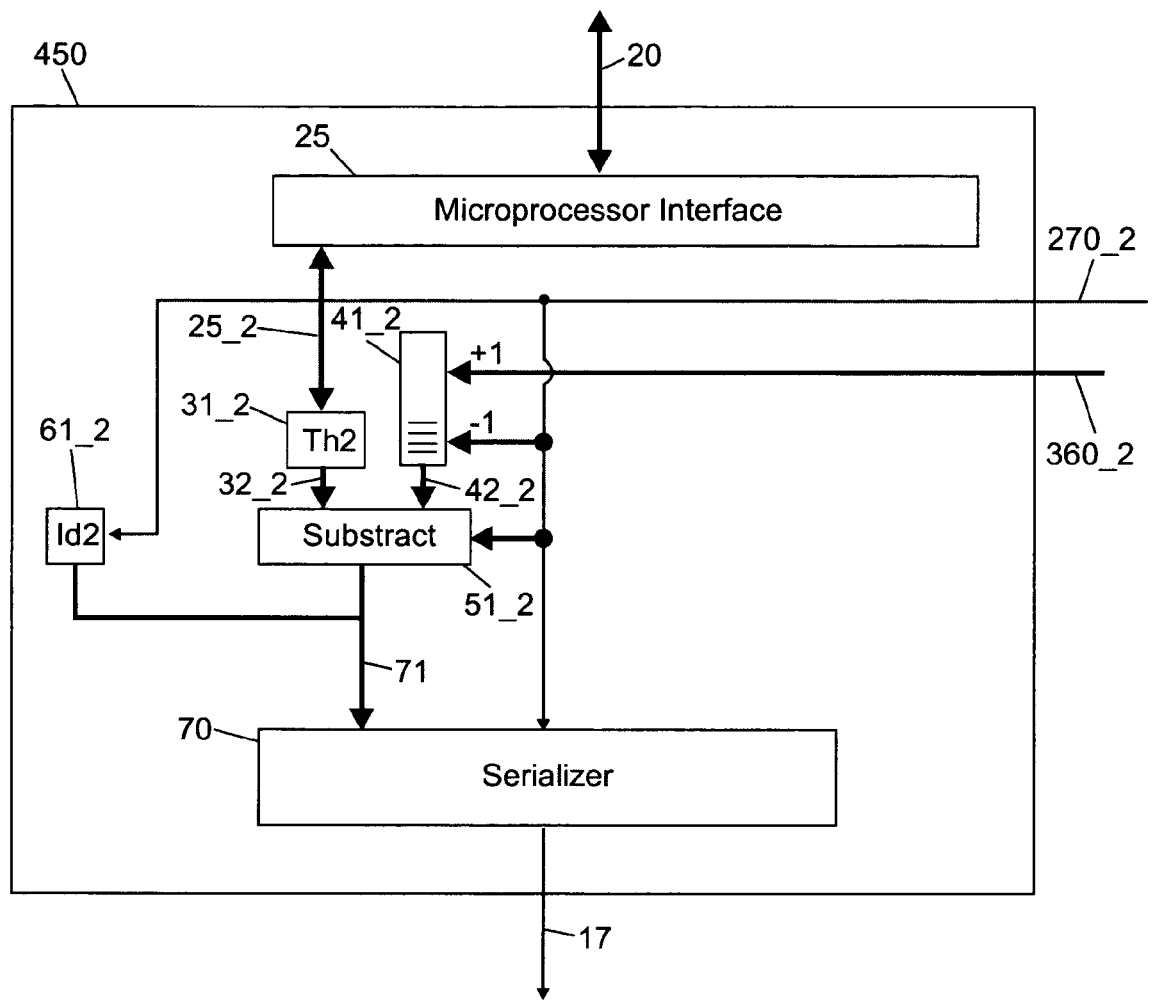
FIG. 5 details the Flow Control Logic of the present invention.

Referring now to FIG. 5, the Flow Control block 450 for destination adapter 16_2 is mainly composed of:
- a Microprocessor Interface block 25;
- a flow control logic per adapter made of:
  - a Threshold Register block 31_2,
  - a Counter/De counter block 41_2,
  - a Substract Logic block 51_2
  - an ID register block 61_2;
- a Serializer block 70.

The structure and operation of the different blocks are now described.

Microprocessor Interface (25):

The microprocessor interface block 25 is connected to the Control Point card 21 through bus 20. The interface allows the user to access the Threshold register block 31_2 in order to predefined a threshold value.

Flow Control Logic:

It is made of a Threshold register block 31_2, a Counter/De counter block 41_2, a Substract logic block 51_2 and an ID register block 61_2.

To detail more each task:

a. The Threshold register is programmed through the microprocessor interface by the user which access the Control Point card. Its output bus 32_2 is connected to a first port 'A' of the Substract logic block 51_2.

b. The Counter block is incremented each time a data packet is stored into the shared memory 250 and is decremented each time a data packet is read from the shared memory. An increment input signal is connected to the Lease Address Selector block 350 through signal 360_2. A decrement input signal is connected to the Release Address Selector block 300 through signal 270_2. The Counter/De counter data bus 42_2 is connected to a second port 'B' of the Substract logic block 51_2.

c. The Substract combinatorial logic block 51_2 always computes on the fly the difference between the two input ports 'A-B'. The result is only transmitted to serializer 70 onto bus 71 when signal 270_2 is activated which means each time a data packet for adapter 16_2 is stored into shared memory 250. The result represents the flow control information to be transmitted to the adapter cards. When the result is close to the predefined threshold value, this means that the traffic to the respective adapter is very low; when the result is close to zero, this means that the traffic to the respective adapter is heavy. The result is sent to all the adapters connected to the switch and when the flow control information is received by each adapter, each one may take appropriate action to adapt its traffic. As an example let's assume that there is no traffic at all in the switch and therefore the shared memory block 250 stores and transmits the data packets only to adapter 16_2. In this case the counter/de counter is equal to zero and each adapter receives the threshold value as the flow control information for adapter 16_2. This means that adapter 16_2 is receiving data packets without any congestion. Now, let's assume that there is a high priority traffic going on in the switch with adapter 16_3. The counter block 41_2 is incremented each time a data packet is stored for adapter 16_2 but will not be decremented until the traffic for adapter 16_3 reduces. Therefore each adapter receives from the Substract logic a flow control information going to zero. This means that adapter 16_2 is not receiving data packets already sent. Therefore all adapters that want to transmit data packets to adapter 16_2 should reduce their traffic until the flow control information reaches again the threshold value. To recall, the present system allows a dynamic picture of the use of the shared memory of the switch engine and provides a real time information to the whole adapter cards communicating with the switch engine.

ID Register (61_2):

The ID Register block 61_2 provides the address of the destination adapter. In a preferred embodiment, this address is hardwired on the board on 2 bits. As an alternative, the address should be programmed from the Control Point through the microprocessor interface.

Serializer (70):

The serializer block 70 receives a parallel bus 71 made of 10 bits, 8 flow control bits which come from the substract logic block 51_2 and 2 ID bits which come from the ID Register block 61_2. Each read access to the shared memory block 250 for adapter 16_2 activates the control signal 270_2 which then starts the serializer. The transmission begins with the ID bits followed by the flow control bits. This information is received by each adapter card in the hub through the serial link 17.

The principle of operation of the system is now detailed as previously explained with adapter 16_1 transmitting a data packet to adapter 16_2. Adapter 16_1 first builds in a conventional manner a data packet and sends it to the switch card 14 onto data bus-in 13_1. Next, the data packet is routed by the switch card using the routing index information contained in its header. Then the data packet is transmitted to the destination adapter 16_2 on data bus-out 15_2. In parallel with the transmission of the data packet, the flow control information is sent to all the adapters 16_i through corresponding serial links 17.

The incoming data packet is analyzed by the Header Detection and Packet Validation block 100_1 which performs the following tasks:

sending the data packet destination address (port #2 in the description) to the Lease Address Selector block 350 through bus 140;

informing the Write Memory Controller block 150 through signal 130_1 to perform a write operation.

Next the Lease Address Selector block 350 performs the following tasks:

decoding the data packet destination address and activating the corresponding chip select signal 360_2;

enabling the buffer block 351 to transmit the address stored into the En-queue Register block 380_1 to the Write Memory Controller block 150. This address was previously taken from the Free Buffer Queue block 400;

storing this address into De-queue Destination FIFO block 310_2;

transferring the active chip select signal 360_2 to the Flow Control block 450 to increment counter block 41_2.

Finally the Write Memory Controller block 150 stores the data packet into the Shared Memory block 250.

As a background task, the Release Address Selector block 300 performs the following operations:

reading the De-queue Destination FIFO of adapter 16_2 by activating signal 320_2;

comparing its content to zero which is the default value when the FIFO is empty;

if the control signal 301_2 is not activated, reading the De-queue Destination FIFO of next adapter;

if the control signal 301_2 is activated, performing a memory read operation and releasing the address into the Free Buffer Queue block 400 for further use.

The Read Memory Controller block 200 controls the Shared Memory block 250 through bus 210. The read address comes from bus 220 and the read command comes from signal 270_2. The data packet is transmitted from the memory to adapter 16_2 through the Destination Output Buffer block 280_2 on bus 15_2.

While the data packet is transmitted to adapter 16_2 the Flow Control block 450 transmits the flow control information to all adapters on serial link 17.

The counter is incremented when a data packet is stored into the shared memory 250 and decremeted when a data packet is read. The content of the counter/de counter is subtracted from the threshold value defined by the user at the initialization time. The result represents the flow control information: when the value is close to the threshold value the traffic to the adapter 16_2 is very low, when the value is close to zero the traffic to the adapter 16_2 is heavy. This value along with the destination adapter address is serialized by Serializer block 70 and sends to each adapter card in the hub.

The invention claimed is:

1. A data packet flow control system for a data packet switching node that transmits data packets received from at least one source network adapter to at least one destination network adapter, the switching node comprising means for temporarily storing the data packets, the flow control system comprising: identifier means (100-1) to determine the at least one destination adapter of each received data packet; flow control logic (41-2, 31-2) coupled to the storing means for computing a data packet flow value representing flow of traffic for the at least one destination adapter; and means (61-2, 70) coupled to the identifier means and to the computing means for transmitting the computed data packet flow value simultaneously to the at least one source network adapter and to at least one destination adapter, each time a data packet for the at least one destination network adapter is stored into the storing means.

2. The system of claim 1 wherein the flow control logic for computing a data packet flow value comprises: means (41-2) for counting every access to the storing means; and means (31-2, 51-2) for comparing the counting to a threshold value.

3. The system of claim 2 wherein the counting means is a counter incremented on each write access and decremented on each read access of the storing means.

4. The system of claims 1 or 2 further comprising means (21, 25) to predefined the threshold value.

5. The system of anyone of claims 1 or 2 wherein each received data packet comprises a header having at least a destination adapter address field and wherein the identifier means comprise means (100-1) for extracting the destination adapter address from the destination adapter address field.

6. The system of claims 1 or 2 wherein the storing means comprises means for setting active a write control signal at each write access and means for setting active a read control signal at each read access.

7. The system of claim 6 wherein the counter is incremented when the write control signal is active and is decremented when the read control signal is active.

8. The system of claim 1 wherein the at least one source network adapter and the at least one destination network adapter further comprise means to regulate the data packet flow upon reception of the data packet flow control value.

9. The system of claim 1 wherein the incoming data packets are ATM data packets.

10. A data transmission system comprising a plurality of Local Area Networks (LANs) (10-1 to 10-4) interconnected by a hub (12) including the same plurality of LAN adapters (16-1 to 16-4) respectfully connected to said LANs and a data packet switching node (14) interconnecting all LAN adapters to transmit a plurality of data packets from at least one source adapter of the plurality of LAN adapters to at least one destination adapter of the plurality of LAN adapters, each data packet including a header containing at leas the address of the at least one destination adapter and wherein the data packet switching node comprises storing means to store the plurality of incoming data packets, the data transmission system being characterized in that data packet switching node comprises a data packet flow controls system according to claim 1.

11. The data transmission system of claim 10 wherein the data packet switching node comprises an active and a backup data packet flow control system.

12. A method comprising:
providing a hub including a communication device for routing packets from a source to a destination;
storing in a memory packets to be transmitted from the source to the destination;
loading a first predefined value representative of a threshold value in a threshold register;
generating a second value based upon packets being written into and being removed from said memory;
correlating the first predefined value with the second value to generate a data packet flow value representing flow of traffic at said destination.

13. The method of claim 12 further including transmitting to at least the source and destination the packet flow value.

14. The method of claim 13 wherein the source uses the packet flow value to adjust the rate at which packets are transmitted from said source.

15. The method of claim 12 wherein the second value is being generated by a counter/de counter device whose contents increases when a frame is loaded into the memory and decreases when a frame is removed from said memory.

16. The method of claim 12 wherein correlating values includes subtracting the second value from the first predefined value.

17. The method of claim 1 further including transmitting the data packet flow value to at least the destination.

* * * * *